(12) United States Patent
Kennedy et al.

(10) Patent No.: US 6,651,217 B1
(45) Date of Patent: Nov. 18, 2003

(54) SYSTEM AND METHOD FOR POPULATING FORMS WITH PREVIOUSLY USED DATA VALUES

(75) Inventors: Kevin Kennedy, Oklahoma City, OK (US); David Clancy, Berkeley, CA (US); Steve Falkenburg, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/388,353

(22) Filed: Sep. 1, 1999

(51) Int. Cl.[7] .............................................. G06F 17/00
(52) U.S. Cl. ...................................... 715/507; 715/505
(58) Field of Search ................................. 715/505, 506, 715/507, 508, 536; 345/760; 709/59, 60, 61

(56) References Cited

U.S. PATENT DOCUMENTS

| | | | | |
|---|---|---|---|---|
| 4,595,980 A | * | 6/1986 | Innes ............................ | 704/8 |
| 5,666,502 A | * | 9/1997 | Capps ......................... | 345/811 |
| 5,794,259 A | * | 8/1998 | Kikinis ........................ | 707/507 |
| 6,088,700 A | * | 7/2000 | Larsen et al. ................. | 707/10 |
| 6,182,099 B1 | * | 1/2001 | Nakasato ..................... | 715/536 |
| 6,192,380 B1 | * | 2/2001 | Light et al. .................. | 707/505 |
| 6,208,339 B1 | * | 3/2001 | Atlas et al. .................. | 345/780 |
| 6,421,693 B1 | * | 7/2002 | Nishiyama et al. ......... | 707/507 |

OTHER PUBLICATIONS

Oracle Corporation, "Oracle Brings You the World", Dec. 1996 downloaded on May 29, 2003 from http://web.archive.org/web/19971211045751/www.oracle.com/international/html/ and http://web archive.org/web/19971211045609/www.oracle.com.br/ (6 printed pages).*
"Background Of The Invention" of the above–identified pending U.S. patent application.
vCard: The Electronic Business Card document, version 2.1, Jan. 1, 1997, pp. 1–4.
Co–pending U.S. patent application Ser. No. 09,388,351.

* cited by examiner

*Primary Examiner*—Sanjiv Shah
*Assistant Examiner*—Charles Bieneman
(74) *Attorney, Agent, or Firm*—Banner & Witcoff, Ltd.

(57) ABSTRACT

A system and method is provided for populating a plurality of fields appearing on a form such as an HTML-based form rendered on a browser. When a user first populates a form and submits it for processing, a web browser employing the inventive principles determines whether the user has completed a profile containing commonly used fields (e.g., name, address, phone number and the like). If no profile has been completed, data values from the form populated by the user are extracted, matched to the commonly used fields, and used to populate the profile, which is stored for future use. The user is also invited to supply missing data values for other fields contained in the profile. Thereafter, when the user displays the same or a different form, the user is given the option to automatically populate the form using values stored in the profile.

14 Claims, 9 Drawing Sheets

FIG. 3

Eddie Bauer Order Form

Order • Send Order • Place Catalog Order • Virtual Dressing Room • Search • Help

SHOP *Eddie Bauer*®
SHIPPING & BILLING INFORMATION
Click here to log in and fill in your ordering information automatically

Bill to:

| | |
|---|---|
| First Name: | JOE |
| Last Name: | USER |
| E-mail Address: | JUSER@HOTMAIL.COM |
| Address: | 123 C STREET |
| Add'l Address: | |
| City: | SUNNYVALE |
| State/Province: | CA |
| Zip/Postal Code: | 94089 |
| Country: | USA |
| Daytime Phone: | 555-555-5555 |
| Evening Phone: | 555-555-5555 |
| Fax Number: | |
| EB Rewards Number (optional): | |

Connection to www.eddiebauer.com is secure (RC4-40)

FIG. 4

SYSTEM AND METHOD FOR POPULATING FORMS WITH PREVIOUSLY USED DATA VALUES

TECHNICAL FIELD

This invention relates generally to computer-implemented processing of data entry forms, such as HTML-generated forms on Internet web pages. More particularly, the invention provides a method and apparatus for automatically populating data fields in forms using data values previously specified by a user.

BACKGROUND OF THE INVENTION

Computer systems conventionally display forms with fields into which a user enters information such as a name, birth date, password, and the like. Modern browsers display forms by rendering Hyper Text Markup Language (HTML) to generate fields arranged in a particular structure that can be populated by a user. Web sites that accept shopping orders from on-line customers, for example, generate forms requiring entry of the customer's name, address, telephone number, and credit card information. Usually, the user must repeatedly enter this information each time a site is visited. Although information entered by the user is stored on the web site, the form does not retain the information for future use if the web site is revisited.

Some web sites can recognize previous customers and thus avoid re-prompting for the same information on a subsequent visit. Nonetheless, if the user visits a new web site that he or she has never before visited, the same information must be re-entered on a different form generated by the different web site. Much of the information requested on these forms is redundant or readily available from other sources (e.g., name and address), yet the creators of different forms generally have no easy way to share information previously entered by the user on an earlier form. Privacy issues have thwarted many potential solutions to this problem, and it is cumbersome for web site designers to include special logic on their web site to recognize previous visitors to the site.

So-called "cookies" (small data files stored by a web site on the user's local computer) are sometimes used to retain information locally that can be recalled later by a web site that the user has previously visited. Such "cookies," however, vary widely from site to site, and require cumbersome programming logic on each web site to implement them. Moreover, users can block the storage of these cookies, and users may be generally suspicious of their use by untrusted web sites.

One attempt to solve some of these problems was a prior art feature included in the Microsoft Internet Explorer 4.0 product known as a "profile assistant." This feature made it easier for web sites to retrieve registration and demographic information from users who had previously provided that information. Frequently used information such as user name, address, and the like was stored securely in protected storage on the client computer. Web servers could request to read this information, but it was shared only if users gave their consent in a pop-up request box each time a site was visited.

While the profile assistant provided a potential solution to the aforementioned problems, in practice it required that each web site write script to request information from the user's stored information. If the user declined to grant permission to share the information, the solution was effectively thwarted. It was also inconvenient and time consuming for the user to complete a full profile and store it on the user's machine. Finally, some users viewed the function as intrusive because it required immediate user input to confirm that the feature should be enabled each time a web site was visited.

A prior art data schema known as the "vCard" schema has been used for certain frequently referenced data fields across application programs. This schema established standardized field identifiers that were to be used for the same data fields, and was intended to facilitate the transfer of personal profile information among applications. For example, the field identifier "vCard.FirstName" was reserved as a field identifier for storing a user's first name, regardless of the form or application program into which the user's name was to be entered. (The user would typically only see a label such as "First Name.") This schema does not, however, address the aforementioned problems. As one example, it is difficult to force millions of web sites to conform to standard field identifiers or to retrofit existing web pages to the existing schema.

The prior art provides tools to suggest previously used values to a computer user when prompting the user for information. For example, some e-mail programs suggest possible recipient names in the "to" field which match previously stored user names. When the user types the first character of a recipient's name, a possible choice that matches the first character appears in the field. As another example, well-known Internet browsers provide a user with a pull-down menu of choices in a browser's address field, such that the user can review previously used web site addresses in order to select an address.

These conventional techniques, however, suffer from many of the same disadvantages as the aforementioned solutions. The application program itself (i.e., the e-mail program) must be specially modified to support the feature, and previously used field values cannot be shared among other application programs on the same computer unless those applications are also modified. Moreover, all application programs would need to adopt standard field identifiers in order for the scheme to work properly.

For most web forms there is no deterministic way to associate a given field label with its corresponding a text entry area (i.e., labels used on web forms are not linked to field identifiers on the page). For example, a web page that displays the word "Name" next to a text input box invites the user to enter his or her name into the text input box. However, there is no easy way for software reading the text entry box to associate the "Name" label with the text input box, since field labels are not intrinsically linked to other field attributes such as field name and data type. Consequently, while field labels might provide an attractive basis for correlating similar fields across forms, there is no easy way for the underlying software to identify and correlate these labels with values entered by the user.

In summary, Internet web pages containing form fields create special problems, because each web site defines the format and behavior of its own forms, and there is no easy way to share or suggest previously entered data values across different web sites or servers. Moreover, because of privacy concerns, sharing previously entered form values for different web sites may be undesirable or even impossible in many cases.

SUMMARY OF THE INVENTION

The present invention overcomes many of the foregoing problems by providing a method and apparatus that assists a user in storing into a profile data values entered on a form on the basis of labels associated with fields on the form. When the user displays a form having the same or similar field labels, a matching process suggests data values for fields on the form. According to one embodiment, the user can initiate this process by clicking on an "autofill form" button.

A web browser employing various inventive principles heuristically associates a label with a corresponding text input box and, based on the association, populates the text input box with a previously stored field value. The match can be performed on the basis of a dictionary of strings representing common labels in order to retrieve previously used values. An algorithm uses a hierarchical searching method to intelligently choose likely label candidates for a given field on a web page and confirms that choice by matching it against a previously stored dictionary of potential field labels. Other features include the ability to match fields with a multi-lingual dictionary; color coding of automatically populated field values for ease of use; and an initial profile creation step that matches values extracted from a populated form to a basic set of field labels.

BRIEF DESCRIPTION OF THE DRAWINGS

FIG. 3 shows a form comprising field labels and corresponding data entry areas rendered using a document browser such as a web browser.

FIG. 4 shows the form of FIG. 3 after it has been partially filled in by a user.

DETAILED DESCRIPTION OF THE INVENTION

Figure 1:
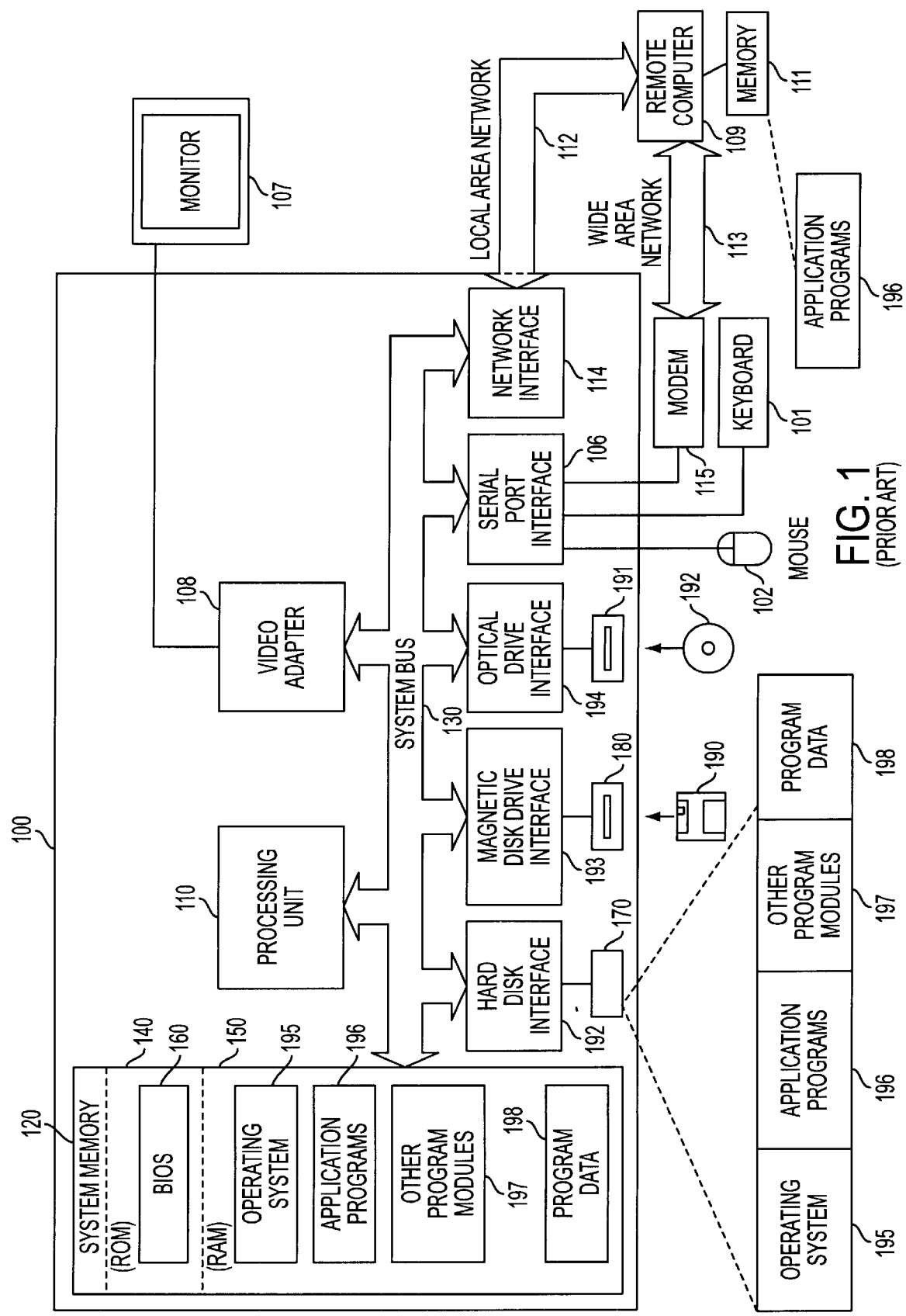
FIG. 1 shows a conventional general-purpose computing environment that can be employed in various embodiments of the invention.

FIG. 1 is a schematic diagram of a conventional general-purpose digital computing environment that can be used to implement various aspects of the invention. Computer 100 includes a processing unit 110, a system memory 120, and a system bus 130 that couples system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150.

A basic input/output system 160 (BIOS), containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. Any of the inventive principles described herein can be implemented in software and stored on any of the aforementioned storage devices.

A user can enter commands and information into the computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
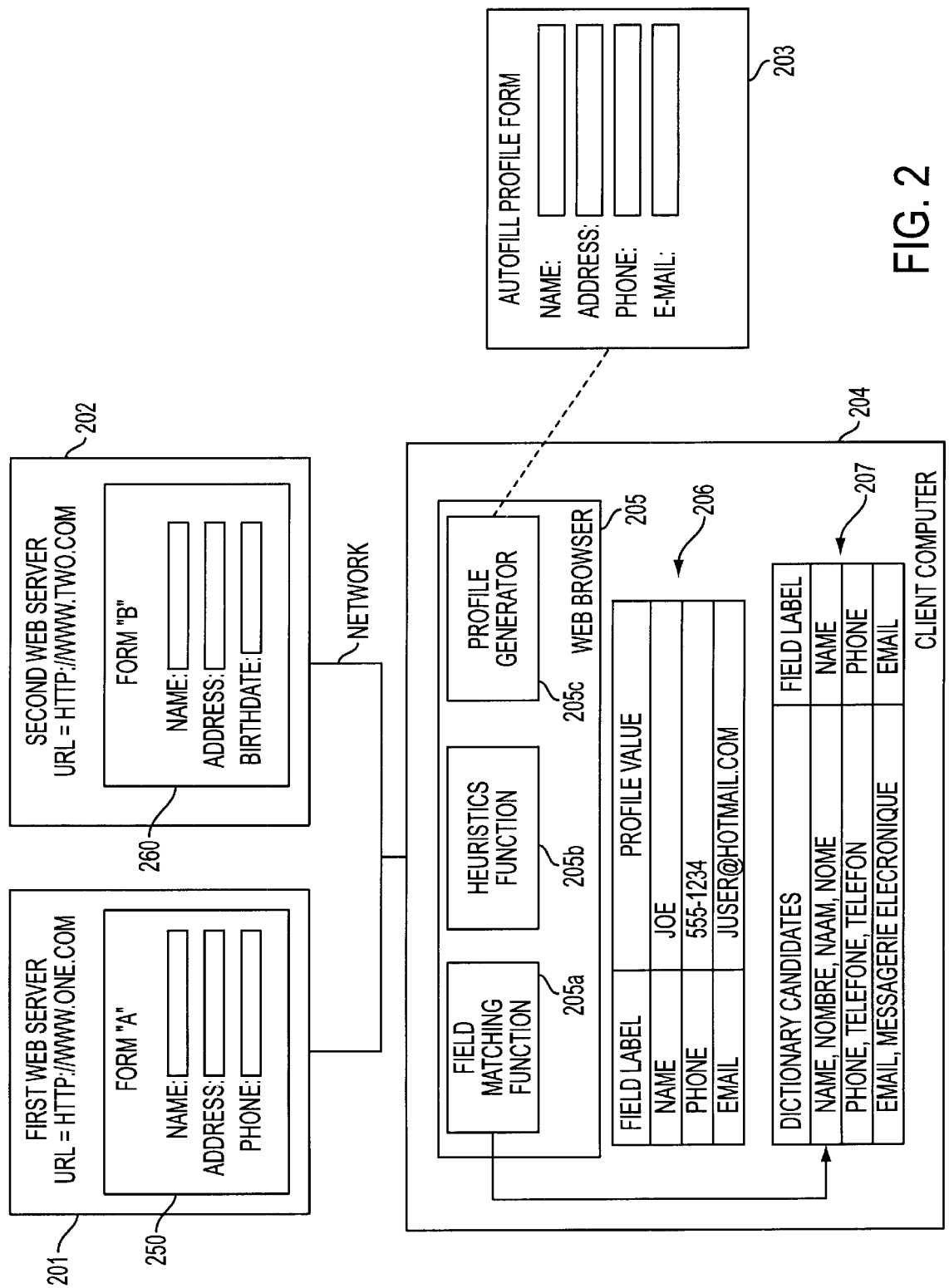
FIG. 2 shows a distributed web-based system employing various principles of the invention.

FIG. 2 shows a web-based distributed system employing various principles of the present invention. As shown in FIG. 2, a client computer 204 is coupled to a first web server 201 and a second web server 202 through a network such as the Internet. Client computer 204 includes a conventional web browser 205 that has been modified in accordance with various principles of the present invention. As is conventional, the user of client computer 204 can retrieve web pages from web servers through the Internet using HTTP protocols, and can display web pages using HTML syntax. Application programs that operate within the context of modified web browser 205 will automatically obtain the benefits of the inventive principles described herein without modification. Alternatively, any application program can be created or modified to operate according to the inventive principles.

As shown in FIG. 2, each web server has an associated Universal Resource Locator (URL) that uniquely identifies the server to client computers on the Internet. For illustration purposes, first web server 201 has a URL of www.one.com and second web server 202 has a URL of www.two.com. Web servers are sometimes referred to as "web sites," and those terms are used interchangeably herein. Each web site may contain one or more web pages that can be linked and retrieved using conventional protocols. Web pages can also be stored locally on client computer 204.

Web pages can include forms that permit a user to enter data into predefined areas (e.g., rectangular boxes, radio buttons, and the like). The forms are defined using HTML syntax and stored in files as web pages. Document browsers display forms by interpreting or "rendering" the HTML and generating display commands that permit a user to navigate among the predefined areas and enter information. After a user has entered information into the appropriate data entry areas, the user typically clicks on a "submit" button that causes the browser to extract data values from the form and transmit them to the server from which the form originated. A web page can include multiple forms of various types and formats.

As shown in FIG. 2, web site 201 includes a first form 250 and second web site 202 includes a second form 260. Each form includes a plurality of data entry fields having an associated field label (e.g., name, address, phone), a field identifier (usually hidden from view), and a corresponding display region into which the user can type information when the web page is displayed using a conventional web browser. For example, an on-line shopping service may require that a customer enter his name, address and telephone number to process an order. Similarly, a government agency may require that a citizen enter his or her name, address, and date of birth.

A field label corresponds to what the user will actually see on the display, while the field identifier or field name is frequently not displayed but permits software to identify the field. For example, a field label for a user's name might be displayed as "NAME," while the field identifier, visible to only the underlying software, might be "user_last_name." As explained in more detail below, field labels are typically not stored as an attribute of a field, but are instead defined separately and can be placed in any number of locations near the data entry area.

As shown in FIG. 2, forms 250 and 260 require overlapping information; namely, the name and address of the person filling out the form. After the user has entered data into the fields, web browser 205 submits the form with the entered values to the web site from which the form was generated. Some web sites employ "script" executed by browser 205 to perform various functions on client computer 204 in connection with the processing of forms.

According to some embodiments of the invention, data values entered by the user are extracted and used to create a "profile" for the user, such that subsequently displayed forms containing similar field labels can be automatically populated at the touch of a button. For example, the first time that the user of client computer 204 visits web site 201 and enters his name, address, and telephone number into form 250, modified web browser 205 associates the values entered by the user with field labels appearing near the values and stores the values into a data structure 206 for future use. Consequently, when the user visits different web site 202 and displays different form 260, web browser 205 matches one or more of the field labels appearing on form 260 to previously stored values (using, for example, a "dictionary" 207). These features preferably operate independently of any logic at each web site, so that the automatic population of data values occurs without reprogramming existing web sites, and without requiring the storage of previously used data values at each web site.

One technique for obtaining an initial set of data values to be used for populating subsequent forms is to prompt the user to view and complete an "autofill profile" the first time a form is used. For example, when the user first displays a form including certain common field labels (e.g., name, address, and the like), a profile generator function 205c extracts values entered by the user, uses the values to populate a standard "autofill profile" form 203, and prompts the user to fill in any missing values. As shown in FIG. 2, for example, when the user first visits web site 201 and displays form 250, after entering his or her name, address, and telephone number, modified web browser 205 determines that no autofill profile has been created for the user. When the user attempts to submit the completed form, profile generator function 205c extracts the name, address, and phone number entered by the user, fills out the corresponding fields in autofill profile 203 by matching field labels in form 250 with those in autofill profile 203, and prompts the user to fill in missing data items such as e-mail. When the user has completed the user profile, the completed form is saved and used as the basis for populating future forms. Consequently, when the user visits a site that requests an e-mail address, modified web browser 205 uses the value previously provided in the autofill profile.

The aforementioned feature is similar to the prior art "profile assistant" feature, but differs in two important respects. First, the autofill profile can be populated automatically for the user based on a form the user has already used, rather than requiring that the user enter values in a blank autofill form. Second, the basis for detecting matches between previously used field values is, according to the present invention, field labels that are displayed near each text input box, rather than field identifiers that may vary widely from form to form. Thus, for example, the principles of the present invention would detect matches between text boxes on different forms where each text box was located near a label comprising the string "name." Other approaches that rely on matching field identifiers, an intrinsic attribute of a form element, would fail if one form identified the field as "user_name" and another identified a similar field as "unam." In other words, the present inventors believe that web forms are more likely to have similar field labels (i.e., what the user sees) than field identifiers (i.e., what the programmer sees).

As shown in FIG. 2, one possible implementation for the inventive principles includes a field matching function 205a that matches field labels to those previously stored in data structure 206. According to certain embodiments, a dictionary 207 is used to match field labels extracted from a form to fields for which a previously stored profile value is available. As shown in FIG. 2, for example, if the text string "nombre" is extracted from a form near a text input box, it can be matched against a dictionary of candidate field labels in dictionary 207 and correlated to the field "name," for which a previously stored value exists in profile data storage area 206. Consequently, the value "JOE" can be used to populate the text box located on the form near the string "nombre."

A heuristics function 205b can also be provided to accommodate differences in field labels (e.g., language differences for the same label) and to determine which of a plurality of potential matches is likely the "best" match based on a various criteria such as field label placement and the like. As described in more detail herein, for example, there may be several text strings located near a text input box, and one of the strings may be selected as the more likely field label based on its location and/or content. Other implementations are of course possible, and FIG. 2 is intended to illustrate only one of many such possibilities.

According to one embodiment, previously used data values are not used to populate a displayed form until the user affirmatively selects that choice. This avoids the possibility that a nefarious web site operator could extract previously used values that were used to populate a form before a user had the opportunity to prevent the values from being used. For additional security purposes, the values in data store 206 could be stored in encrypted form in a protected area in client computer 204. As explained in more detail herein, the values can be correlated or combined with data from other sources, such as values used by the profile assistant, an entry for the user in an operating system address book, commonly used field identifiers, or field names from the vCard schema.

Figure 3:
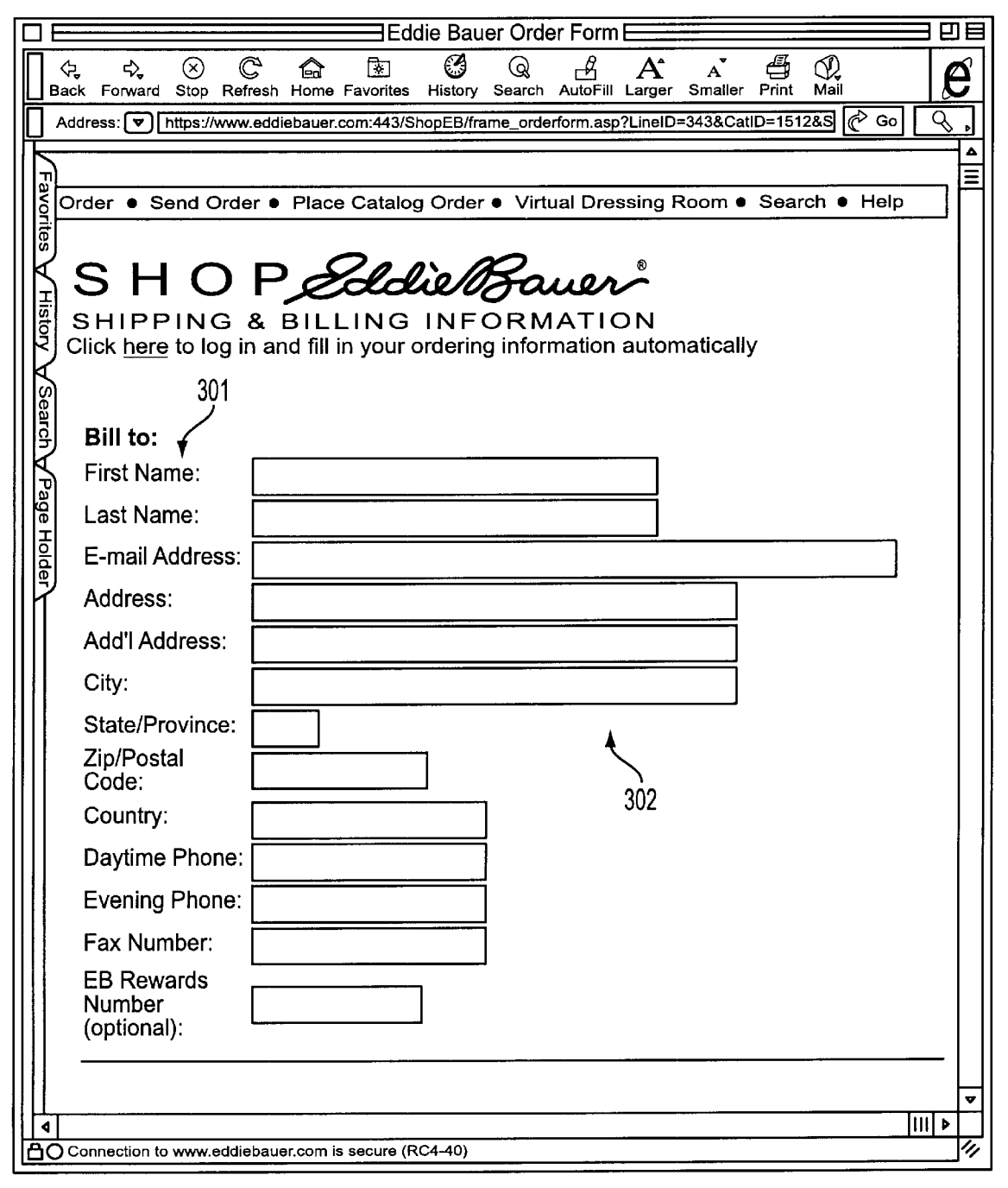

FIG. 3 shows a form, as rendered in a document browser window, which permits a user to place an on-line shopping order. As is conventional, the form comprises a plurality of fields, each having a defined text box area as generally depicted by reference numeral 302. A plurality of text labels generally indicated by reference number 301 is located in close proximity to the text boxes, such that each label appears to be associated with a text box. As will be described in more detail herein, the text labels do not actually form part of a field, but can instead by defined by a web form designer to appear near a corresponding text box.

FIG. 4 shows the form of FIG. 3 after a user has entered his first name, last name, and various other data items requested by the form. As is conventional, each field input value appears in a text box on the display, and when the form is completed, the user clicks on a "submit order" button (not shown in FIG. 4) to submit the completed form to the web site that will process the order. In accordance with various embodiments of the present invention, if no "autofill profile" was yet been defined by the user, the user is invited to complete or choose such a profile (using values extracted from the form) so that data values entered by the user can be used for future forms.

Figure 5:
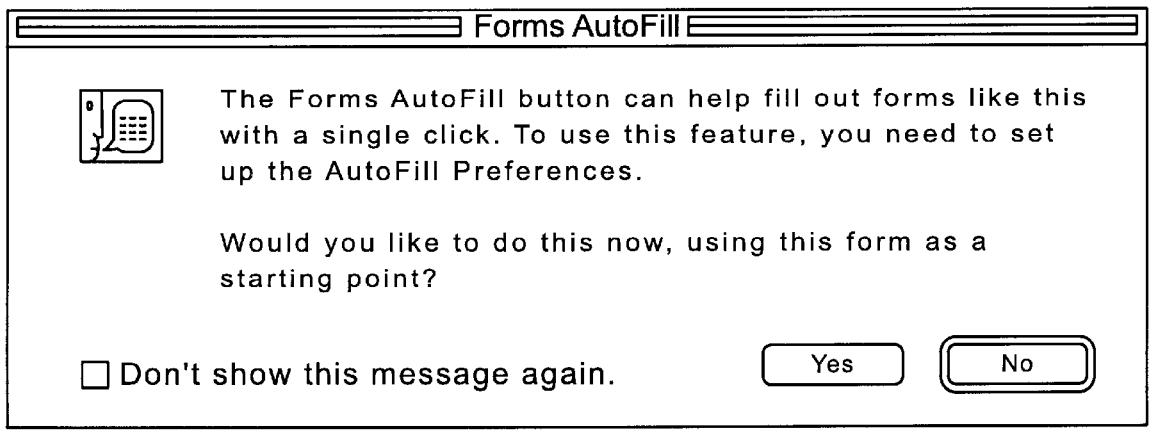
FIG. 5 shows an "autofill" dialog box that prompts the user to fill autofill preferences to be used on subsequently displayed forms.

FIG. 5 shows a dialog box that is presented to the user after he clicks on a "submit form" button where no autofill profile yet exists. As shown in FIG. 5, the user is invited to use the form he or she just completed as the basis for completing an autofill profile. Upon clicking "yes" to this option, the user is presented with an autofill profile of the type shown in FIG. 6. It is self-evident that the particular prompting techniques (e.g., dialog boxes and the like) shown and described herein are exemplary only, and are by no means intended to limit or define the only approach for carrying out the inventive principles.

Figure 6:
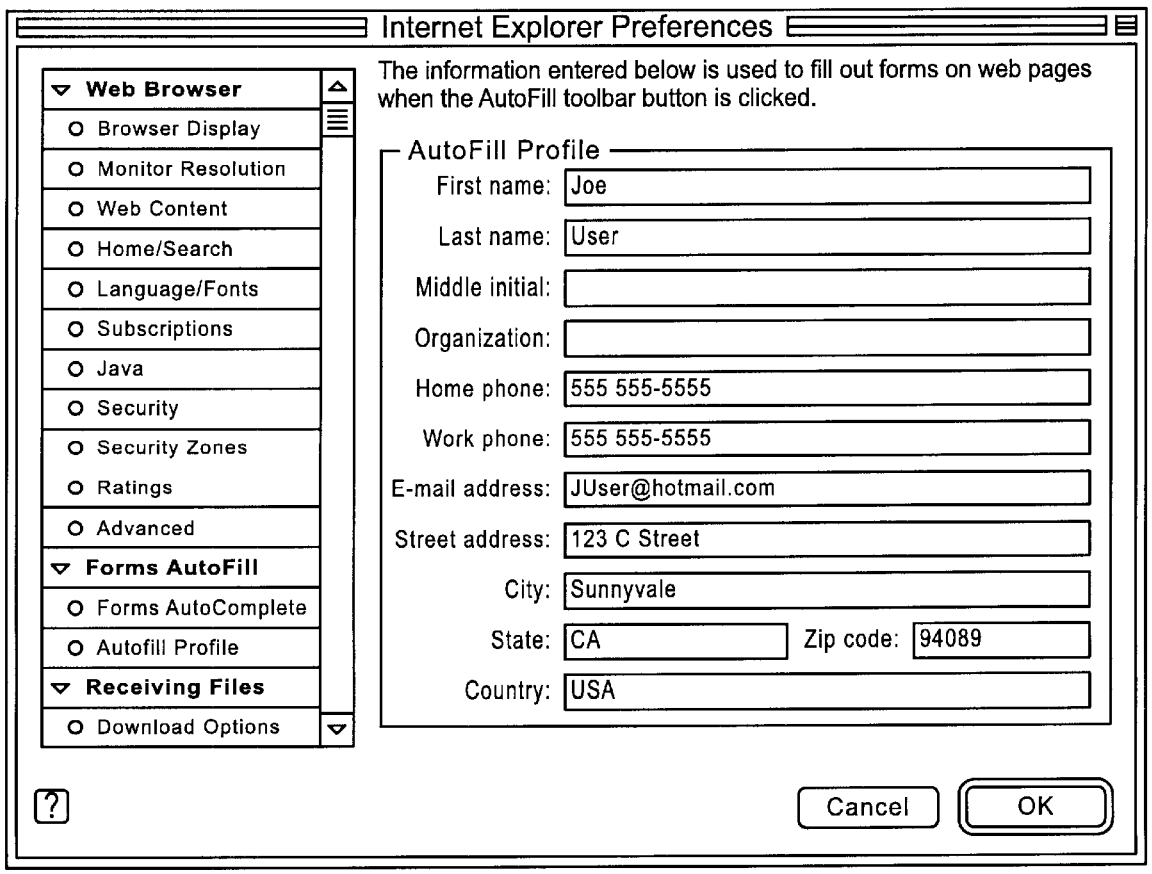
FIG. 6 shows an autofill preferences form that permits the user to provide additional information to be used on subsequently displayed forms.

If the user selects "yes" to the option displayed in FIG. 5, an autofill profile form such as that shown in FIG. 6 is displayed to the user. As can be seen in FIG. 6, the autofill profile comprises a set of commonly used fields on forms, such as the user's first name, middle initial, last name, telephone numbers, and the like. In accordance with one aspect of the present invention, data values for the fields that were filled in by the user in FIG. 4 are extracted, matched with the fields in the autofill profile, and presented to the user as shown in FIG. 6. In other words, the profile is partially created by an automatic matching process to save the user the inconvenience of manually entering fields that were previously filled out in FIG. 4. Additionally, the user has the option of entering information for other fields for which no match was found. As shown in FIG. 6, for example, no middle initial or organization is yet known based on the user's input. Other commonly used fields that could be included on the autofill profile include fax numbers, spouse's names, mother's maiden name, credit card numbers, passwords, driver's license information, and the like. Once the user has entered any additional field values that he or she wishes, the user clicks on "OK" and the values appearing in the autofill profile are stored in a data storage area such as area 206 of FIG. 2.

Figure 7:
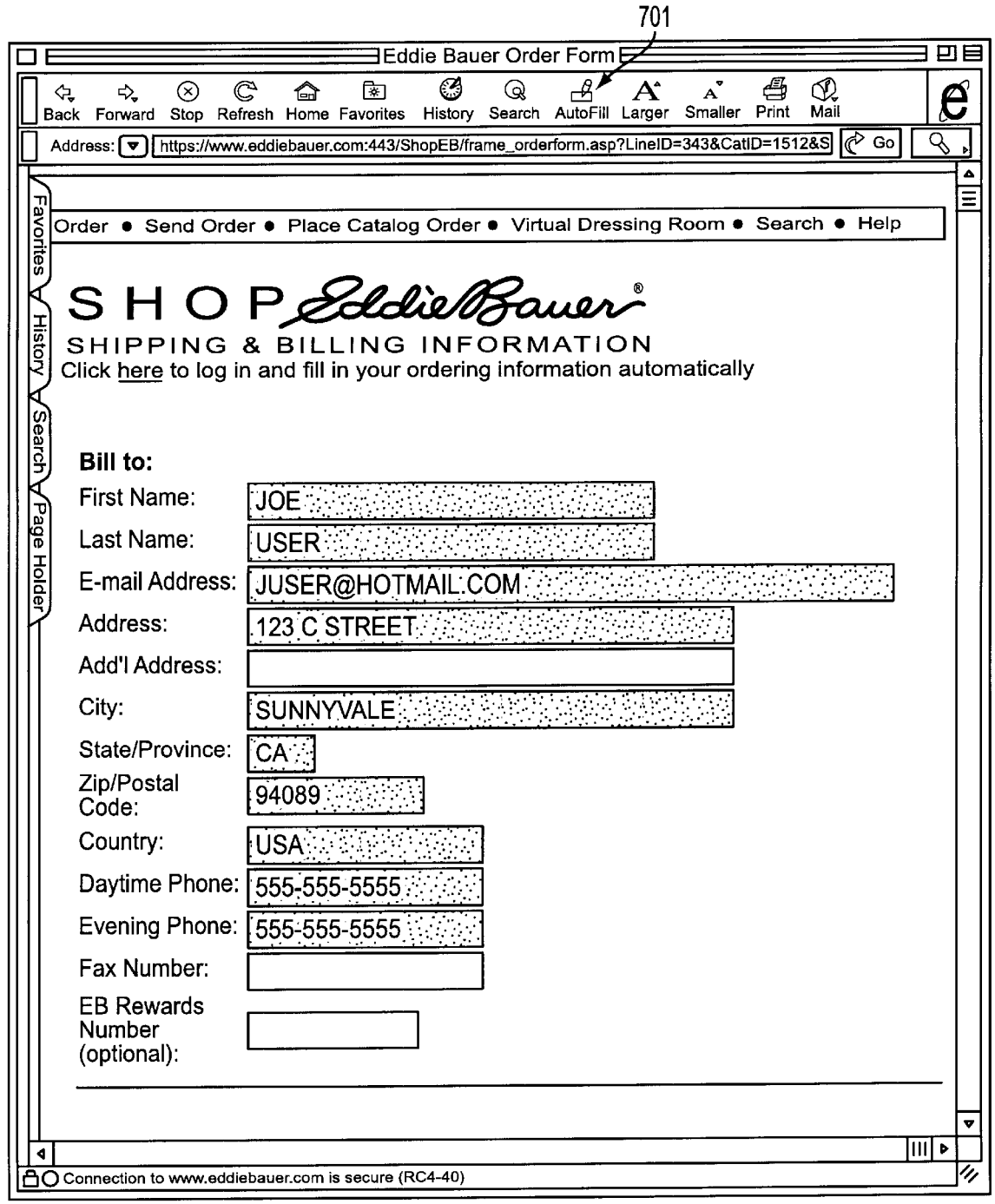
FIG. 7 shows the form of FIG. 3 with certain fields highlighted to indicate that they contain automatically suggested values.

Assuming that the user had turned off the computer, returned a few days later, and again visited the same web site to place a new order, according to the inventive principles the user would be able to automatically populate the form using an "autofill" option as shown in FIG. 7. According to one embodiment, a special "autofill" option 701 is provided as part of document browser 205 which, when selected by the user, automatically populates the form for all fields that can be matched to the previously stored user profile. In one embodiment, all field values that are automatically populated in such a manner are highlighted using a different color (e.g., yellow) to indicate to the user that those fields were supplied from previously used values. This gives the user the opportunity to verify any fields that may need to be changed, and permits correction of any fields that were incorrectly matched. As shown in FIG. 7, for example, all fields that were automatically populated using option 701 are shown in a highlighted (shaded) color. Processing of the form would occur normally; i.e., the user would click on "submit form" to process the order.

Figure 8:
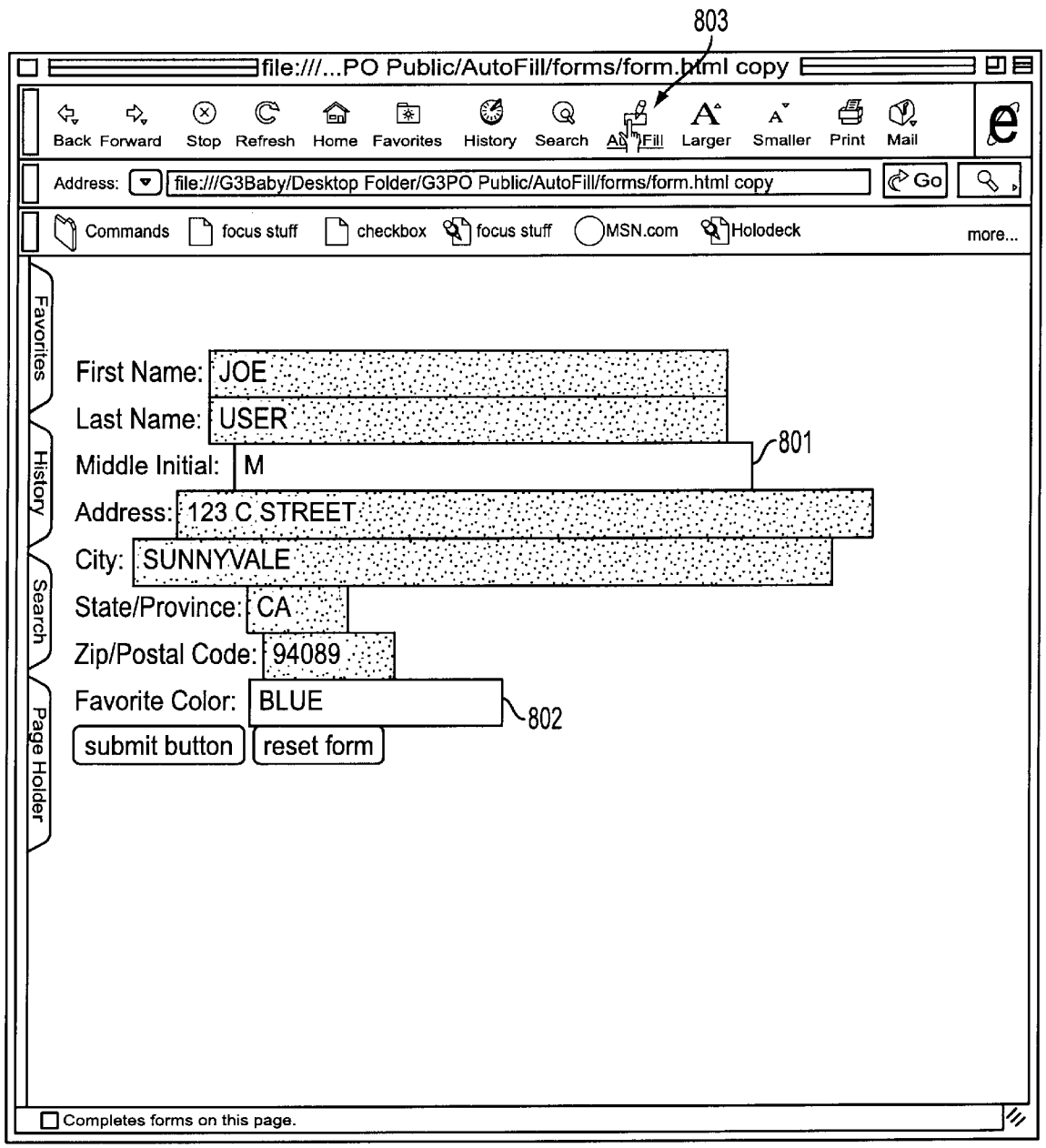
FIG. 8 shows a different form with certain fields highlighted to indicate that they contain automatically suggested values.

Assuming the user visited a different web site having a different form, the user can click on the "autofill" option and have all fields for which a match is found automatically populated according to the inventive principles. Turning to FIG. 8, for example, a different form is shown from that of FIG. 4. However, the form comprises some fields having labels that match those previously stored in the profile. Upon selecting "autofill" option 803, those fields for which matching labels could be found are automatically populated with previously stored values from the autofill profile, and are highlighted (e.g., shaded or colored) to indicate those fields that were automatically populated. As shown in FIG. 8, two fields that were not automatically populated (and thus requires new entry from the user) are the user's middle initial 801 and the user's favorite color 802.

According to one variation of the invention, upon detecting that the user had entered a middle initial in text box 801 of FIG. 8, profile generator 205c again displays autofill profile 203 (see FIG. 6), including the newly entered middle initial, and ask the user to confirm that this newly entered value is to be stored and used in the future. Other embodiments and variations on this technique are of course possible. Nor is such a feature a necessary part of the invention.

Figure 9A:
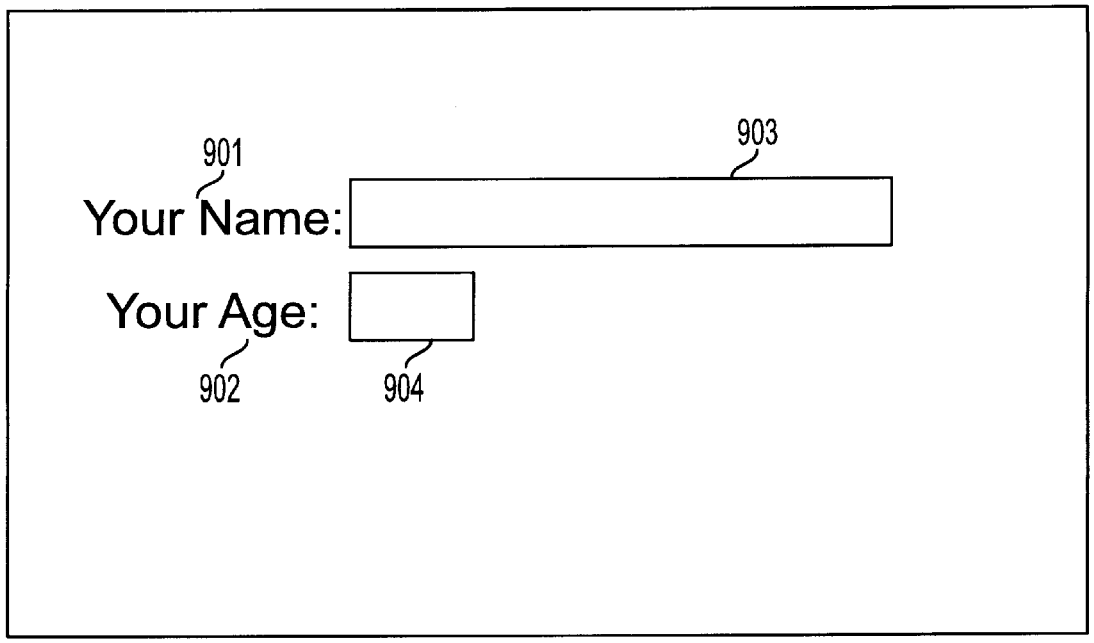
FIG. 9A shows two form fields including labels located to the left of the corresponding data entry areas.
Figure 9B:
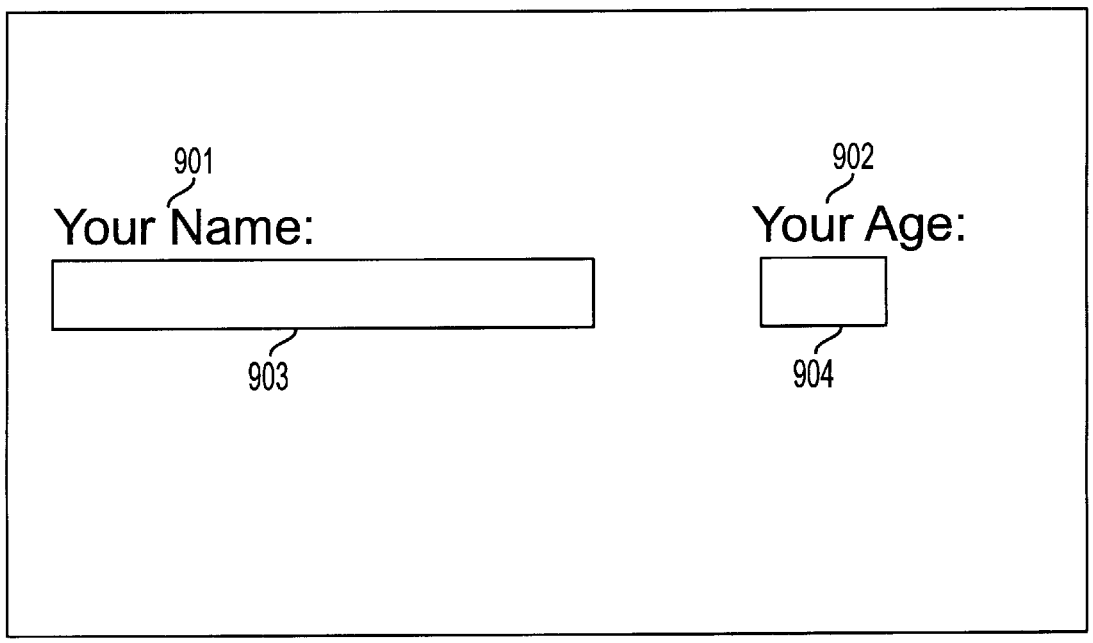
FIG. 9B shows two form fields including labels located above the corresponding data entry areas.

Various techniques for matching previously used field values with field labels appearing on different forms will now be explained, beginning with reference to FIGS. 9A and 9B. HTML web forms can include one or more text input boxes, clickable buttons, multiple-choice checkboxes, pull-down menus, or clickable images, typically placed within an HTML <form> tag. Once a user fills out fields in a form, the user typically clicks on a "submit" button (or presses the return key) to submit the form to the web site. The browser collects the user-supplied values and sends them to the server for processing.

One particular type of form element is a text entry field, which appears in a browser window as an empty box and accepts a line of user input that becomes the value of the element when the user submits the form to the server. To create a text entry field in a form, an <input> form element is set to type "text" and assigned a name (e.g., "username"). Each field is usually accompanied by a label located near the text box. For example, the following HTML fragments when rendered by a browser display two text entry fields with accompanying labels "Your Name" and "Your Age" located to the left of the corresponding data entry area using a table construct. The corresponding form display would be similar to that shown in FIG. 9A.

```
<form method=POST action="http://wwwjunk.com/
    demo">
    <table border=0>
        <tr valign=top>
            <td align=right>Your Name:</td>
            <td align=left><input type=text name=username
                size=32 maxlength=80>
            </td>
        <tr valign=top>
            <td align=right>Your Age:</td>
            <td align=left>input type=text name=age size=3
                maxlength=3>
            </td>
        </tr>
    </table>
</form>
```

While often located to the left of the data input box, labels are sometimes located above, to the right of, below, or in other areas close to the data input area. For example, FIG. 9B shows a different variation of the form in which the labels appear above the pertinent data entry boxes. Depending on the design of the web page, the label associated with a given data input box can be located in different regions on the page; labels are not deterministically located based on the location of the text-input box.

According to one embodiment of the present invention, an HTML-based page is scanned to identify the label most likely associated with a given data input box, and that label is used to match previously stored data values for a given field. This approach differs from other approaches that rely on matching a field name attribute (e.g., "username" in the above example), which may vary significantly from web site to web site. In other words, different web site designers may use widely varying attribute names to reference a person's name (e.g., "uname", "username", "nm", etc.), but are likely to use commonly known labels for the user to see (e.g., "Your Name" or "Name"). Consequently, according to one aspect of the present invention, labels associated with text entry fields are used as a basis for identifying previously populated fields. The principles of the invention can be applied not only to text input boxes, but also to checkboxes, multiple choice elements, radio buttons, action buttons, multi-line text areas, and other form constructs. Consequently, the invention should not be deemed limited to text input boxes.

One difficulty with matching field labels to those previously used is that a field label in HTML is typically a separate text item that is not an attribute of a field (i.e., a field label cannot be referenced or detected by referencing the field by its name). One technique for identifying labels associated with fields is to search each HTML page for possible labels that are located near the field data entry areas. This can be done in a hierarchical order. For example, text appearing immediately to the left of a text input box would be a good candidate for the label. If no text appears immediately to the left of a text input box, then text appearing directly above the text input box might be the next best candidate, and so on. Field attributes can also be used to help determine what label is associated with a given field. When a potential label is found, it is compared to a dictionary of strings that represent common labels for autofill profile data. When a match is found, the input field is populated with the matched profile data and preferably highlighted with a different color to caution the user to double-check these values before submitting the form.

Figure 10:
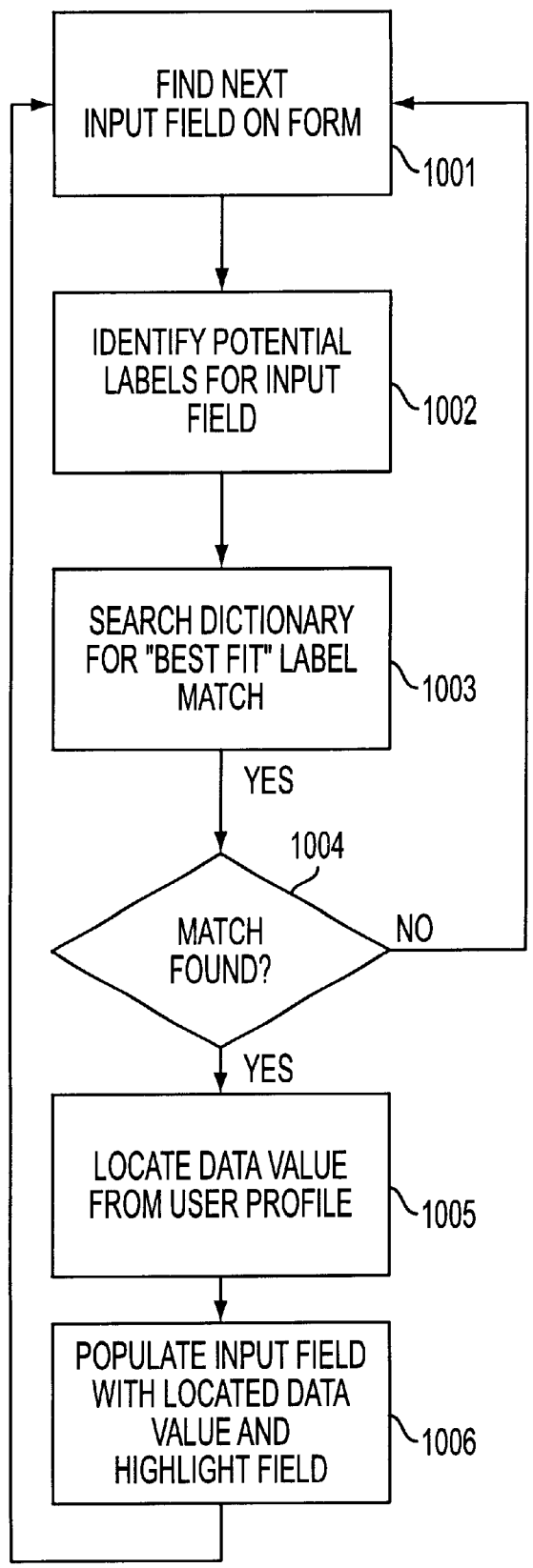
FIG. 10 shows a series of steps that can be carried out in accordance with one embodiment of the invention.

FIG. 10 shows steps that can be executed to carry out a method of the present invention. It is assumed that the user has clicked on an "autofill" button to automatically populate a displayed form. Beginning in step 1001, the next input field on the form is identified by, e.g., scanning the HTML file until an input field is found. In step 1002, potential labels for that input field are identified, preferably using one or more techniques discussed below, although these techniques are by no means the only possible ones.

In step 1003, the candidate label or labels are compared to a dictionary of strings constituting commonly used labels (e.g., name, address, etc.). The dictionary can be quite robust and can include, for example, mappings among different terms. For example, the dictionary can include multi-lingual entries, such as "name", "nombre" (Spanish for "name"), and "mei" (Japanese for "name"). Note that this can also provide the ability to match fields on forms containing mixed languages on the same form. Abbreviated versions of commonly used labels can also be included in the dictionary (for example, "address", "addr", and "add"). Moreover, the dictionary can map vCard values to labels. The dictionary entries can also be arranged in a particular order to ensure that matches near the top of the list are preferred over other matches appearing later in the list. Alternatively, a "best fit" approach can be used by considering other field attributes and the degree of match between candidates and dictionary strings. In addition to vCard mapping, field labels can be matched against the emerging Electronic Commerce Modeling Language (ECML) standard, which is documented at www.ecml.org.

In step 1004, if no match was found, the field is not populated and processing resumes at step 1001 until no more fields are found. If a match is found, then in step 1005 a previously stored data value is retrieved from the user profile, and in step 1006 the input field is populated with the located data value. Additionally, the input field is preferably changed to a different color or shading to indicate to the user that the field has been automatically populated.

As described above, certain heuristics can be used to increase the likelihood of a successful match in fields. In one embodiment, modified web browser 205 scans adjacent HTML in a document to identify field labels that are likely associated with a given input field. The scanning can be done by first attempting to identify a field from a table cell to the left of the current input element; then attempting a match from a table cell above the current element; then attempting a match from a table cell to the right of the current element; then attempting to match from text to the left of the input element, and so forth. In effect, the scanning can search surrounding text to identify the most likely label for the field. Although there are many different methods of searching for labels on a web page, the following pseudocode mock-up illustrates one possible approach for this type of search:

```
<script language="JavaScript">
function populate( ) {
  // Extract the forms and cycle through them.
  docForms = top.frames["main"].document.forms;
  for (i=0; i < docForms.length; i++) {
    prev = " ";
    // Loop through the elements in the form.
    curForm = docForms [i];
    for (j=0; j < curForm.elements.length; j++) {
      // Set the current element.
      curElement = curForm.elements[j];
      if (curElement.type != "text") continue;
      formField = false;
      // Try to identify field from left table cell.
      formField = tableLeft(curElement);
      if (formField) {set(curElement, formField); continue;}
      // Try to identify field from above table cell.
      formField = tableUp(curElement);
      if (formField) {set(curElement, formField); continue;}
      // Try to identify field from right table cell.
      formField = tableRight(curElement);
      if (formField) {set(curElement, formField); continue;}
      // Try to identify field from text to the left.
      formField = textLeft(curElement);
      if (formField) {set(curElement, formField); continue;}
      // Try to identify field from current cell.
      formField = inputName(curElement);
      if (formField) set(curElement, formField);
    }
  }
}
function inputName( ) {
  // Get the function argument.
  curElement = arguments [0];
  // Check the name value for the current element.
  testString = curElement.name;
  field = patternMatch(testString);
  return field;
}
```
-continued
```
function tableLeft( ) {
  // Get the function argument.
  curElement = arguments [0];
  // Check the table cell to the left.
  if (curElement.parentElement.tagName == "TD") {
    curCell = curElement.parentElement;
    if (curCell.parentElement.tagName == "TR" &&
        curCell.cellIndex > 0) {
      curRow = curCell.parentElement;
      leftCell = curRow.cells[curCell.cellIndex - 1];
      testString = leftCell.innerText;
      field = patternMatch(testString);
      return field;
    }
  }
  // Nothing matched.
  return false;
}
function tableUp( ) {
  // Get the function argument.
  curElement = arguments [0];
  // Check the table cell above.
  if (curElement.parentElement.tagName == "TD") {
    curCell = curElement.parentElement;
    if (curCell.parentElement.tagName == "TR") {
      curRow = curCell.parentElement;
      if (curRow.parentElement.tagName == "TBODY" &&
          curRow.rowIndex > 0) {
        curTBody = curRow.parentElement;
        aboveRow = curTBody.rows[curRow.rowIndex - 1];
        if (aboveRow.cells.length > curCell.cellIndex) {
          aboveCell = aboveRow.cells[curCell.cellIndex];
          testString = aboveCell.innerText;
          field = patternMatch(testString);
          return field;
        }
      }
    }
  }
  // Nothing matched.
  return false;
}
function tableRight( ) {
  // Get the function argument.
  curElement = arguments [0];
  // Check the table cell to the right.
  if (curElement.parentElement.tagName == "TD") {
    curCell = curElement.parentElement;
    if (curCell.parentElement.tagName == "TR" &&
        curCell.cellIndex < curCell.parentElement.cells.length - 1) {
      curRow = curCell.parentElement;
      rightCell = curRow.cells[curCell.cellIndex + 1];
      testString = rightCell.innerText;
      field = patternMatch(testString);
      return field;
    }
  }
  // Nothing matched.
  return false;
}
function textLeft( ) {
  // Get the function argument.
  curElement = arguments [0];
  // Check the text to the left.
  tr = top.frames["main"].document.body.createTextRange( );
  tr.moveToElementText(curElement);
  tr.collapse( );
  tr.moveStart("word", -3);
  testString = tr.text;
  field = patternMatch(testString);
  return field;
}
function set( ) {
  // Get the function arguments.
  curElement = arguments[0];
  field = arguments[i];
  // Get the value to use in setting the field.
  value = getValue(field);
```

-continued

```
    // Set the field with the value.
    curElement.value = value;
    // All done.
    return;
}
function patternMatch( ) {
    // Get the function argument.
    testString = arguments [0];
    // Look for a match.
    if (contains(testString, "email")) return "email";
    if (contains(testString, "-mail")) return "email";
    if (contains(testString, "street") && prev != "streetAddr") return
"streetAddr";
    if (contains(testString, "address") && prev != "streetAddr") return
"streetAddr";
    if (contains(testString, "city")) return "city";
    if (contains(testString, "state")) return "stateAbr";
    if (contains(testString, "province")) return "stateAbr";
    if (contains(testString, "zip")) return "zipCode";
    if (contains(testString, "post") && contains(testString, "code"))
return "zipCode";
    if (contains(testString, "country")) return "country";
    if (contains(testString, "phone")) {
        if (contains(testString, "work"))
            return "workPhone";
        else return "homePhone";
    }
    if (contains(testString, "company")) return "company";
    if (contains(testString, "organization")) return "company";
    if (contains(testString, "name")) {
        if (contains(testString, "user")) return false;
        if (contains(testString, "last, first")) return "fullBackward";
        else if (contains(testString, "first")) return "firstName";
        else if (contains(testString, "last")) return "lastName";
        else return "fullForward";
    }
    if (contains(testString, "first") && prev != "firstName") return
"firstName";
    if (contains(testString, "last") && prev != "lastName") return
"lastName";
    if (contains(testString, "middle")) return "middle";
    if (contains(testString, "mi")) return "middle";
    if (contains(testString, "m.i.")) return "middle";
    // No match was found.
    return false
}
function contains( ) {
    // Get the function arguments.
    large = arguments[0].toLowerCase( );
    small = arguments[1].toLowerCase( );
    // See if the first argument string contains the second.
    for (m=0; m <= large.length – small.length; m++) {
        test = true;
        for (n=0; n < small.length; n++) {
            if (large.charAt(m+n) != small.charAt(n)) {
                test = false;
                break;
            }
        }
        if (test) return true;
    }
    // No match was found.
    return false;
}
function getValue( ) {
    // Get the function argument.
    field = arguments[0];
    // Return the corresponding value.
    match = " ";
    if (field == "firstName") match = ** get from user profile **
    else if (field == "lastName") match = ** get from user profile **
    else if (field == "middle") match = ** get from user profile **
    else if (field == "fullForward") match = ** get from user profile **
    else if (field == "fullBackward") match = ** get from user profile **
    else if (field == "email") match = ** get from user profile **
    else if (field == "streetAddr") match = ** get from user profile **
    else if (field == "city") match = ** get from user profile **
    else if (field == "stateName") match = ** get from user profile **
    else if (field == "stateAbr") match = ** get from user profile **
    else if (field == "zipCode") match = ** get from user profile **
    else if (field == "country") match = ** get from user profile **
    else if (field == "homePhone") match = ** get from user profile **
    else if (field == "workPhone") match = ** get from user profile **
    else if (field == "company") match = ** get from user profile **
    if (match != " ") prev = field;
    return match;
}
</script>
<button onclick="populate( )">populate</button>
```

In the code fragments above, once a label is matched to a field, then the value for that field is extracted from the user profile and used to populate the input area.

In addition to matching by labels as illustrated above, matches on fields can be made where a field includes a vCard attribute (e.g., vCard.FirstName). Consequently, for fields having vCard attributes, the vCard attribute would override any labels located near the field, and searching could be stopped without going further.

Additionally, matches could be made based on field name attributes. Thus, for example, a field having a name attribute containing "fax" could be matched to a fax telephone number without regard to labels located near the text input box. Or, a field name could be combined with a label search to provide a high likelihood of success on a match (e.g., if a field contains the string "phone" and there is a label nearby containing the string "work", an inference might be drawn that the field is a work telephone number).

It may be desirable to match labels according to a predetermined order to facilitate matching. In this regard, matching may be attempted in the order of the following fields (i.e., for each label, a match will be attempted for variations of each field below in the order listed):

(1) e-mail address
(2) street address
(3) city
(4) state
(5) zip code
(6) full name
(7) country
(8) phone
(9) work
(10) company
(11) name
(12) user
(13) first name
(14) last name
(15) last/first name
(16) middle initial
(17) fax number Thus has been described a method and apparatus for automatically populating a form comprising a plurality of fields. The foregoing explanation includes many variations and embodiments, and the invention is not intended to be limited to the specific details disclosed herein. Consequently, the invention is limited only by the claims appended hereto.

What is claimed is:

1. A computer-implemented method of entering information, comprising the steps of:

(1) displaying on a computer screen a form comprising a first plurality of fields each including an initially empty data entry region into which a data value can be entered by a user;

(2) manually entering data values into one or more of the initially empty data entry regions;

(3) indicating that the form should be submitted for processing;

(4) in response to step (3), prompting the user to complete a profile comprising a second plurality of fields each including a data entry region;

(5) in response to the user choosing to complete the profile of step (4), displaying the profile on the computer screen, wherein at least some of the second plurality of fields are populated with data values copied from data values manually entered in step (2);

(6) manually entering data values into one or more of the data entry regions of the second plurality of fields; and (7) storing the profile in a computer storage device for future use.

2. The computer-implemented method of claim 1, wherein step (5) comprises the step of matching text labels appearing on the form with a dictionary of predetermined field labels and, in response to detecting a match, establishing a correspondence between one of the first plurality of fields and one of the second plurality of fields and copying the data value entered in the data entry area of the first corresponding field into the data entry area of the second corresponding field.

3. The computer-implemented method of claim 2, wherein step (5) comprises the step of comparing text labels with predetermined text labels spanning a plurality of languages.

4. The computer-implemented method of claim 2, wherein step (5) comprises the step of searching around each empty data region on the form in a hierarchical directional order to match the text labels.

5. The computer-implemented method of claim 1, wherein step (1) comprises the step of using a web browser to render HTML statements on the computer screen, and wherein step (5) comprises the step of scanning the HTML statements to identify matching fields.

6. The computer-implemented method of claim 1, further comprising the steps of:

(8) displaying a second form comprising a third plurality of fields at least some of which differ from those appearing on the form and those appearing on the profile, wherein each of the third plurality of fields has associated therewith a data entry region;

(9) in response to the user indicating that the second form should be automatically populated, retrieving one or more data values from the profile and using the one or more retrieved data values to populate at least some of the data entry regions associated with the third plurality of fields; and

(10) highlighting the data entry regions populated in step (9).

7. The computer-implemented method of claim 6, wherein step (9) comprises the step of matching text labels appearing on the second form with prestored text strings to identify matching data values in the profile.

8. A computer readable medium storing computer executable instructions that perform the steps of:

(1) displaying on a computer screen a form comprising a first plurality of fields each including an initially empty data entry region into which a data value can be entered by a user;

(2) manually entering data values into one or more of the initially empty data entry regions;

(3) indicating that the form should be submitted for processing;

(4) in response to step (3), prompting the user to complete a profile comprising a second plurality of fields each including a data entry region;

(5) in response to the user choosing to complete the profile of step (4), displaying the profile on the computer screen, wherein at least some of the second plurality of fields are populated with data values copied from data values manually entered in step (2);

(6) manually entering data values into one or more of the data entry regions of the second plurality of fields; and (7) storing the profile in a computer storage device for future use.

9. The computer-readable medium of claim 8, wherein step (5) comprises the step of matching text labels appearing on the form with a dictionary of predetermined field labels and, in response to detecting a match, establishing a correspondence between one of the first plurality of fields and one of the second plurality of fields and copying the data value entered in the data entry area of the first corresponding field into the data entry area of the second corresponding field.

10. The computer-readable medium of claim 9, wherein step (5) comprises the step of searching around each empty data region on the form in a hierarchical directional order to match the text labels.

11. The computer-readable medium of claim 9, wherein step (5) comprises the step of comparing text labels with predetermined text labels spanning a plurality of languages.

12. The computer-readable medium of claim 8, wherein step (1) comprises the step of using a web browser to render HTML statements on computer screen, and wherein step (5) comprises the step of scanning the HTML statements to identify matching fields.

13. The computer-readable medium of claim 8, wherein the computer executable instructions further perform the steps of:

(8) displaying a second form comprising a third plurality of fields at least some of which differ from those appearing on the form and those appearing on the profile, wherein each of the third plurality of fields has associated therewith a data entry region;

(9) in response to the user indicating that the second form should be automatically populated, retrieving one or more data values from the profile and using the one or more retrieved data values to populate at least some of the data entry regions associated with the third plurality of fields; and

(10) highlighting the data entry regions populated in step (9).

14. The computer-readable medium of claim 13, wherein step (9) comprises the step of matching text labels appearing on the second form with prestored text strings to identify matching data values in the profile.

* * * * *